US007479065B1

(12) United States Patent
McAllister et al.

(10) Patent No.: US 7,479,065 B1
(45) Date of Patent: Jan. 20, 2009

(54) SYSTEM AND METHOD FOR AN ENHANCED GAMING DEVICE

(75) Inventors: Lawrence McAllister, Las Vegas, NV (US); James Morrow, Sparks, NV (US); Richard Hunsaker, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 743 days.

(21) Appl. No.: 11/209,895

(22) Filed: Aug. 23, 2005

Related U.S. Application Data

(62) Division of application No. 09/690,289, filed on Oct. 16, 2000, now Pat. No. 6,942,571.

(51) Int. Cl.
*A63F 13/00* (2006.01)

(52) U.S. Cl. .......................................... 463/37; 463/20

(58) Field of Classification Search ............. 463/20–25, 463/35–28; 345/173–176
See application file for complete search history.

(56) References Cited

U.S. PATENT DOCUMENTS

| | | | | |
|---|---|---|---|---|
| 4,353,552 | A | 10/1982 | Pepper, Jr. | |
| 5,198,976 | A | 3/1993 | Form et al. | |
| 5,342,047 | A | 8/1994 | Heidel et al. | |
| 5,376,946 | A | 12/1994 | Mikan | |
| 5,611,535 | A | 3/1997 | Tiberio | |
| 5,697,843 | A | 12/1997 | Manship et al. | |
| 5,704,835 | A | 1/1998 | Dietz, II | |
| 5,766,074 | A | 6/1998 | Cannon et al. | |
| 5,770,533 | A | 6/1998 | Franchi | |
| 5,795,430 | A | 8/1998 | Beeteson et al. | |
| 5,796,389 | A | 8/1998 | Bertram et al. | |
| 5,803,453 | A | 9/1998 | Stephan et al. | |
| 5,951,397 | A | 9/1999 | Dickinson | |
| 5,958,020 | A | 9/1999 | Evoy et al. | |
| 6,004,208 | A | 12/1999 | Takemoto et al. | |
| 6,015,346 | A | 1/2000 | Bennett | |
| 6,135,884 | A | 10/2000 | Hedrick et al. | |
| 6,165,070 | A | 12/2000 | Nolte et al. | |
| 6,201,532 | B1 | 3/2001 | Tode et al. | |
| 6,409,602 | B1 | 6/2002 | Wiltshire et al. | |
| 2001/0013681 | A1 | 8/2001 | Bruzzese et al. | |
| 2004/0053661 | A1* | 3/2004 | Jones et al. | 463/16 |
| 2008/0102916 | A1* | 5/2008 | Kovacs et al. | 463/16 |
| 2008/0165150 | A1* | 7/2008 | Kwon | 345/173 |

* cited by examiner

*Primary Examiner*—Ronald Laneau
(74) *Attorney, Agent, or Firm*—Brooke W. Quist; Andrew B. Chen; Marvin A. Hein

(57) ABSTRACT

An enhanced mechanical gaming system (10) utilizes a touch panel (40) as a user control device for mechanical assemblies and game play features which provides users with the enhanced flexibility and interactivity of a video gaming device in a mechanical gaming device environment. The enhanced mechanical gaming system (10) includes a gaming machine assembly (20), a touch sensor assembly (30) incorporating a substantially transparent touch panel (40), a touch panel controller (50), and touch panel software (60). The gaming machine assembly is a standard gaming machine assembly that has been modified to utilize touch-panel components. The touch panel (40) and the sensor assembly (30) produce touch data when activated, and provide viewing of mechanical assemblies behind the touch panel (40). The touch panel controller (50) acts to control and interpret the touch panel (40). The touch panel software (60) controls and interprets the touch data, as well as applying the touch data to interactive applications of the gaming machine assembly (20).

73 Claims, 4 Drawing Sheets

SYSTEM AND METHOD FOR AN ENHANCED GAMING DEVICE

CROSS-REFERENCE TO RELATED APPLICATIONS

This application is a divisional of U.S. application Ser. No. 09/690,289, filed Oct. 16, 2000 now U.S. Pat. No. 6,942,571, the disclosures of which are herein incorporated by reference in its entirety.

FIELD OF THE INVENTION

This invention relates generally to enhanced mechanical gaming systems and, more particularly, to a system and methodology for enhanced mechanical gaming systems which utilize a touch panel as a user control interface.

BACKGROUND OF THE INVENTION

A variety of gaming machines have been known in the art which provide many different types of interactivity and entertainment for users of the machines. In the past, these gaming machines have been primarily mechanical in nature. However, more recently, there have been a growing number of computer generated games and video gaming machines. This development provided the benefit of expanding the number of games available to players for their entertainment. In addition, these gaming machines provide enhanced options for players, which, in turn, increase the likelihood of maintaining a player's interest in continuing game play. Computer generated games and video gaming machines are also desirable to establishment owners for numerous reasons, including networking capabilities, ease of use, monitoring capabilities, and the like.

A persistent problem, however, is that there is still a significant portion of the public that has a fear or distrust of computers and computer generated games, such as video gaming machines. These players still prefer electromechanical gaming machines. In this regard, these players seem to feel more comfortable with these machines, or that they can "trust" the mechanical gaming machines. As such, a large proportion of gaming machines used in casinos today are of the electromechanical type, e.g., reel spinners/slot machines. This fact has resulted in limiting, to some extent, the amount of computer implementation that has taken place in the gaming industry with respect to these mechanical gaming devices and, consequently, has limited the play options and interactivity afforded a mechanical gaming device user.

This lack of computer implementation in mechanical gaming devices has resulted in some degree of stagnation with respect to consumer excitement and enthusiasm towards traditional mechanical gaming devices. As such, mechanical gaming devices (such as reel spinners and slot machines) have not been able to acquire and utilize the benefits of enhanced flexibility and interactivity which are afforded video gaming devices due to the limitations inherently associated with mechanical gaming devices. This has resulted in a even larger divergence between mechanical gaming devices and video gaming devices, which are already distinguished by separate gaming regulations, as well as customer bases. Many attempts have been made to increase the excitement and interactivity of mechanical gaming devices by adding secondary game features, such as additional buttons, bells, lights, whistles, top boxes, dice, genies, dancing chickens, and the like. These attempts have met with only limited success. Prior attempts have not been able to increase the flexibility and interactivity of mechanical gaming devices to the level achieved by video gaming devices.

Accordingly, those skilled in the art have recognized the need for mechanical gaming machines having enhanced flexibility and interactivity. However, those skilled in the art have also wanted to avoid gaming machines with the associated drawbacks which are frequently attributed to a distrust of computers. The present invention clearly addresses these and other needs.

SUMMARY OF THE INVENTION

Briefly, and in general terms, the present invention resolves the above and other problems by providing new and enhanced mechanical gaming system which provides users with the enhanced flexibility and interactivity of a touch-screen video gaming device. The enhanced mechanical gaming system of the present invention utilizes a touch sensor assembly and incorporated touch panel as a user control device for mechanical gaming assemblies and game play features. The enhanced mechanical gaming system includes a gaming machine assembly, a touch sensor assembly incorporating a substantially transparent touch panel, a touch panel controller, and touch panel software.

More particularly, the gaming machine assembly associated with the enhanced mechanical gaming system of the present invention, can be any of a number of standard gaming machine assemblies that have been modified to utilize touch-panel components, in accordance with the present invention. The touch panel utilizes the sensor assembly and produces touch data when activated, as well as allowing substantially unobstructed viewing of mechanical assemblies behind the touch panel. Further, the touch panel controller is capable of controlling and interpreting the touch panel. Additionally, the touch panel software is capable of controlling and interpreting the touch data, as well as applying the touch data to interactive applications associated with the gaming machine assembly.

In accordance with one aspect of the present invention, the gaming machine assembly of the enhanced mechanical gaming system is preferably a reel spinning slot machine which, more preferably, includes a plurality of reels. Preferably, a user of the reel spinning slot machine is capable of selectively starting and stopping the reels by touching or activating the touch panel at a particular location. Furthermore, a user of the reel spinning slot machine is capable of activating different game features by using distinct types, directions, and durations of touches. Moreover, a user of the reel spinning slot machine is preferably capable of selectively activating features and system controls by touching the touch panel at particular positions.

In accordance with another aspect of the present invention, the substantially transparent touch panel of the enhanced mechanical gaming system is preferably composed of a composite material. Specifically, the composite material touch panel is preferably a clear glass touch panel. In another preferred embodiment of the present invention, the substantially transparent touch panel of the enhanced mechanical gaming system is preferably composed of a metallic material. In yet another preferred embodiment of the present invention, the touch panel includes a polymeric film.

In accordance with still other aspects of the present invention, the touch sensor assembly of the enhanced mechanical gaming system includes a plurality of transducers that are integrated into the touch panel. These transducers may be acoustic, infrared, ultrasonic, resistive, capacitive or any other suitable form of transducer. Preferably, the enhanced mechanical gaming system further includes a bezel to cover the transducers and associated wiring, as well as to protect the transducers from debris, mechanical damage, and electrostatic discharge.

In accordance with other aspects of the present invention, preferably the enhanced mechanical gaming system further includes a generic device controller unit operatively associated with a reel assembly to control such reel assembly. Preferably, a generic device controller unit runs reel controller firmware. Furthermore, the enhanced mechanical gaming system preferably includes a microprocessor connected to the generic device controller unit. In another preferred embodiment of the present invention, the functional responsibilities of both the generic device controller unit and the microprocessor are preformed by a single multitasking embedded control system.

In accordance with yet other aspects, the enhanced mechanical gaming system of the present invention incorporates touch panel software that preferably includes driver software and application software. The driver software is capable of controlling and interpreting data from the touch panel controller. The driver software may be provided by the touch panel manufacturer for various host configurations. Moreover, the microprocessor runs the application software which is capable of making calls to the touch panel drive software and for acting upon touch panel data according to the operational requirements of the particular application.

In a preferred embodiment enhanced mechanical gaming kit of the present invention, the gaming kit modifies an existing gaming machine assembly to utilize a touch panel as a user control device. The gaming kit, in accordance with the present invention, includes a touch sensor assembly incorporating a substantially transparent touch panel, a touch panel controller, and touch panel software. The touch panel utilizes the sensor assembly and produces touch data when activated, as well as allowing substantially unobstructed viewing of mechanical assemblies behind the touch panel. Further, the touch panel controller is capable of controlling and interpreting the touch panels. Additionally, the touch panel software is capable of controlling and interpreting the touch data, as well as applying the touch data to interactive applications of the touch panel and sensor assembly.

In another preferred user enhanced mechanical gaming system of the present invention, the system utilizes multiple touch panels as a user control device for mechanical assemblies. This enhanced mechanical gaming system, in accordance with the present invention, includes a control panel assembly which contains a plurality of touch sensor assemblies incorporating a plurality of substantially transparent touch panels. The enhanced mechanical gaming system further includes at least one touch panel controller and touch panel software. The touch panels utilize the touch sensor assemblies to produce touch data when activated, as well as allowing substantially unobstructed viewing of the mechanical assemblies behind the touch panels. The touch panel controller is capable of controlling and interpreting the activation of the touch panels. The touch panel software is capable of controlling and interpreting the touch data, as well as applying the touch data to interactive applications of the control panel assembly. Moreover, multiple touch panels can be used for the selection of the denomination used during play or when selecting a feature from the feature panel or part of the machine.

In accordance with still other aspects, the present invention relates to a process for enabling enhanced mechanical gaming utilizing a touch panel as a user control device. The process includes providing a gaming machine assembly, utilizing a touch sensor assembly and an incorporated substantially transparent touch panel that produces touch data when activated, providing substantially unobstructed viewing of mechanical assemblies behind the touch panel, controlling and interpreting the touch panel utilizing a touch panel controller, controlling and interpreting the touch data utilizing touch panel software, and applying the touch data to interactive applications of the gaming machine assembly.

In accordance with yet other aspects, the present invention relates to a process for enabling enhanced mechanical gaming utilizing multiple touch panels as a user control device for mechanical assemblies. The process includes utilizing a control panel assembly, providing a plurality of touch sensor assemblies and incorporated substantially transparent touch panels which produce touch data when activated, allowing substantially unobstructed viewing of mechanical assemblies behind the touch panels, controlling and interpreting the touch panels utilizing at least one touch panel controller, controlling and interpreting the touch data utilizing touch panel software, and applying the touch data to interactive applications of a control panel assembly. Again, these panels may be used for controlling numerous interactive features, including, communication with the gaming device, the casino or others, selecting a demonstration used during play, obtaining credit or financing game play, ordering drinks, requesting service and the like.

Moreover, the present invention may be implemented as a computer process, a computing system, or as an article of manufacture such as a computer program product or computer readable media. The computer program product may be a computer storage media readable by a computer system and encoded with a computer program of instructions for executing a computer process. In accordance with yet other aspects, the present invention relates to a computer program product readable by a computing system and encoded with a computer program of instructions for executing a computer process for enhanced mechanical gaming utilizing a touch panel as a user control device for mechanical assemblies. The computer process includes receiving touch data produced when a touch sensor assembly incorporating a substantially transparent touch panel is activated, wherein the substantially transparent touch panel allows substantially unobstructed viewing of mechanical assemblies behind the touch panel; controlling and interpreting the touch panel; controlling and interpreting the touch data; and applying the touch data to interactive applications of a gaming machine assembly. Further, the present invention may be implemented as a computer process for enabling multiple touch panels as a user control device for mechanical assemblies.

The present invention includes a touch panel as a user control device for mechanical gaming devices and systems. Unlike touch glass as applied to video gaming systems, the touch glass allows substantially unobstructed viewing of the mechanical reels, paytables, and the like. That is, rather than using a special surface, such as a bonded film or glass, transducers are provided around the perimeter of the glass surface of the machine for detecting the touch point of the user's finger. The transducers may be acoustic, infrared, ultrasonic, resistive, capacitive, or any other appropriate technology. Accordingly, the present invention is particularly applicable to mechanical slot machines since it allows a user to selectively stop or respin a particular reel by touching the glass at a particular point. In addition, the touch glass provides enhanced player capabilities and interactions with the gaming device by interfacing the player with a game in a new, exciting, and versatile manner. The present invention also enhances the ability of game technicians to interact with the gaming machine, gaming software, network, host, and other related components.

Other features and advantages of the present invention will become apparent from the following detailed description, taken in conjunction with the accompanying drawings, which illustrate by way of example, the features of the present invention.

DETAILED DESCRIPTION OF THE PREFERRED EMBODIMENTS

A preferred embodiment enhanced mechanical gaming system and methodology constructed in accordance with the present invention provides users with the enhanced flexibility and interactivity of a touch-screen video gaming device in a mechanical gaming device. The enhanced mechanical gaming system enables touch-panel gaming machine flexibility and interactivity by utilizing a touch panel as a user control device for mechanical gaming assemblies and processes.

Figure 1:
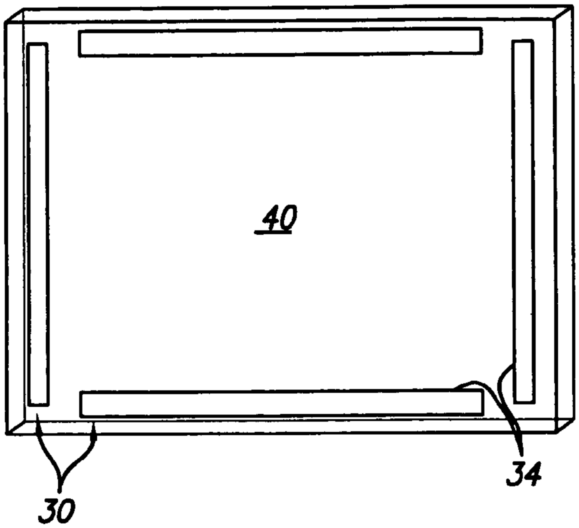
FIG. 1 illustrates a perspective view of a preferred embodiment touch panel incorporating a touch sensor assembly, in accordance with the present invention.
Figure 2:
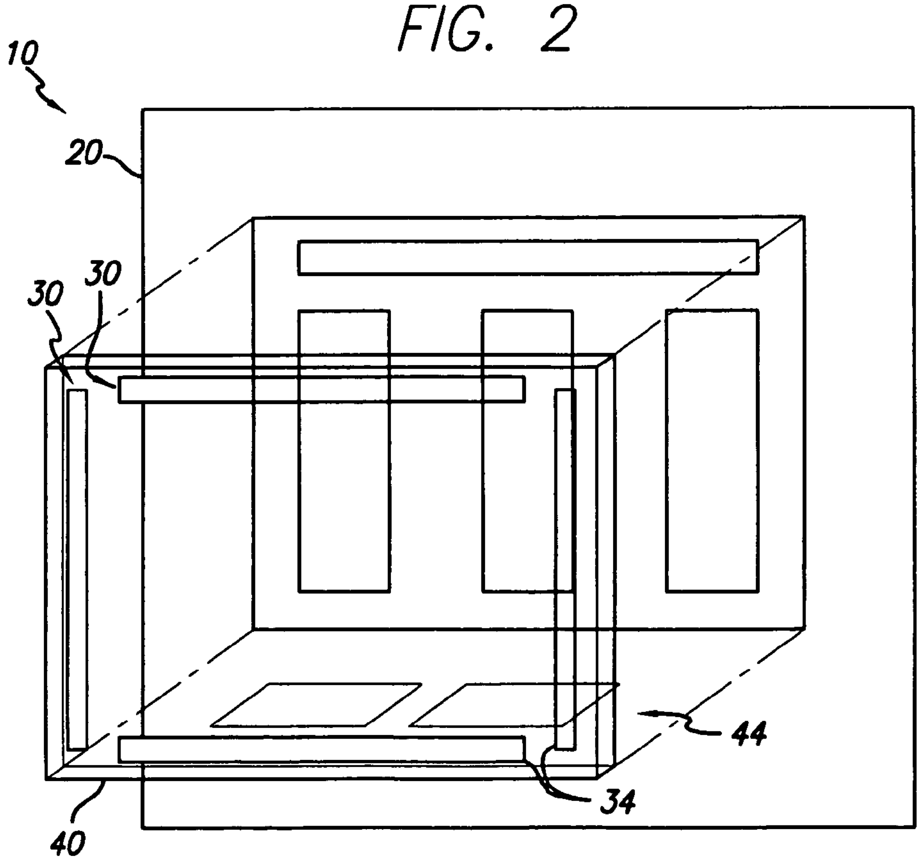
FIG. 2 illustrates an exploded perspective view of an enhanced mechanical gaming system of the present invention with a touch panel and touch sensor assembly separated from the face of a gaming machine assembly.
Figure 3:
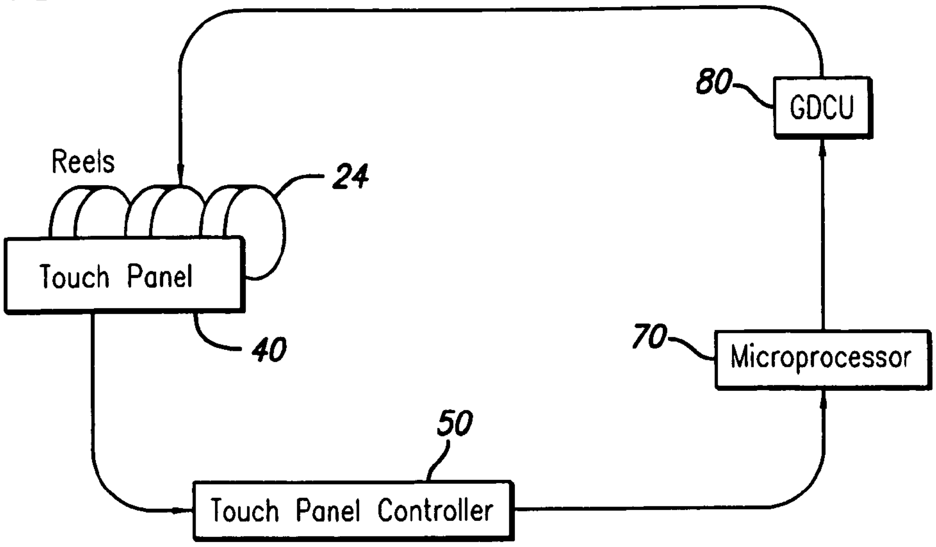
FIG. 3 illustrates an operational flow diagram of an enhanced mechanical gaming system, in accordance with the present invention.
Figure 6:
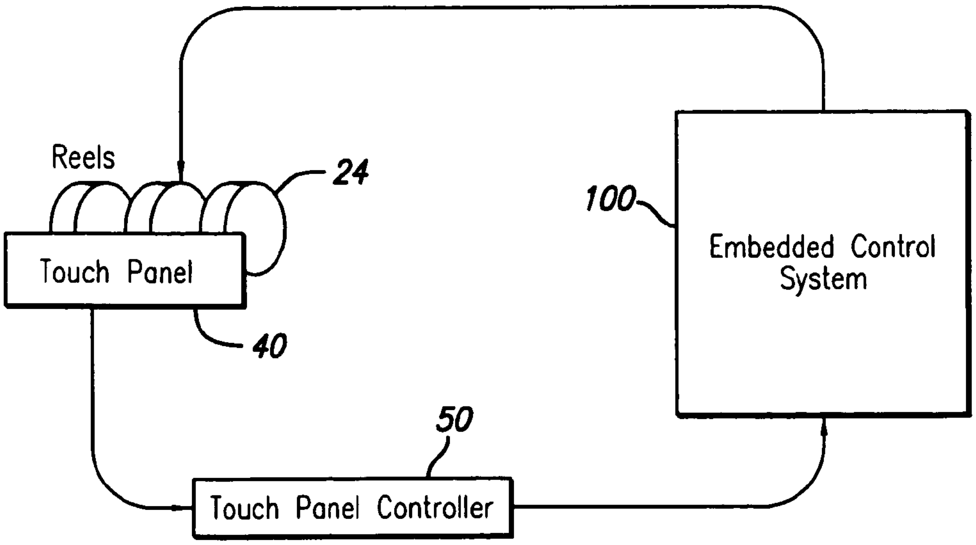
FIG. 6 illustrates an operational flow diagram of an embodiment of the enhanced mechanical gaming system which replaces the GDCU and the microprocessor with a single embedded control system, in accordance with the present invention.

Referring now to the drawings, wherein like reference numerals denote like or corresponding parts throughout the drawings and, more particularly to FIGS. 1-6, there is shown one embodiment of an enhanced mechanical gaming system 10 constructed in accordance with the present invention. Briefly stated, the enhanced mechanical gaming system 10 includes a gaming machine assembly 20, a touch sensor assembly 30 incorporating a substantially transparent touch panel 40, a touch panel controller 50, and touch panel software 60. The gaming machine assembly 20 of the enhanced mechanical gaming system 10 is preferably a standard gaming machine assembly that has been modified to utilize touch-panel components, in accordance with the present invention. As shown most clearly in FIGS. 1 and 2, the touch panel 40 utilizes the touch sensor assembly 30 to produce touch data when touched or activated, as well as allowing substantially unobstructed viewing of mechanical assemblies behind the touch panel. Referring now to FIGS. 3 and 6, the touch panel controller 50 acts to control and interpret the touch panel 40. In this way, the touch panel software 60 controls and interprets the touch data, as well as applies the touch data to interactive applications of the gaming machine assembly 20, and shown in FIGS. 4-5.

Figure 4:
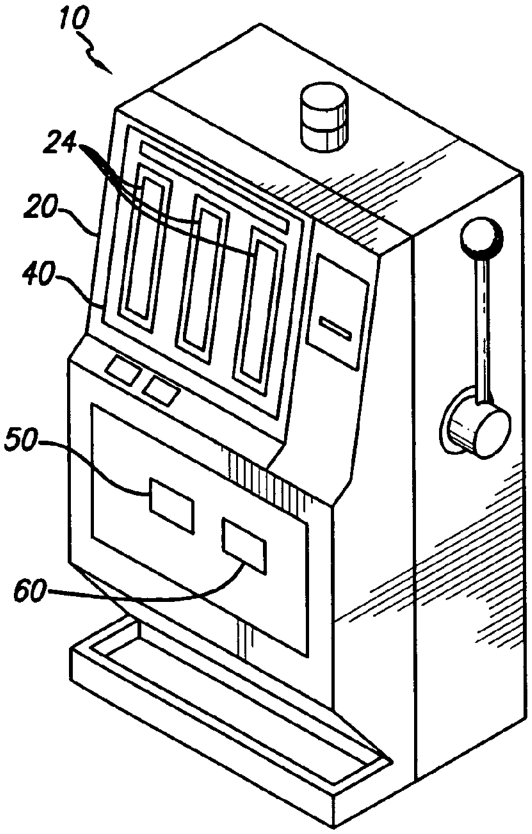
FIG. 4 illustrates a perspective view of an enhanced mechanical gaming system of the present invention with a touch panel and touch sensor assembly incorporated into a gaming machine assembly in accordance with the present invention.
Figure 5:
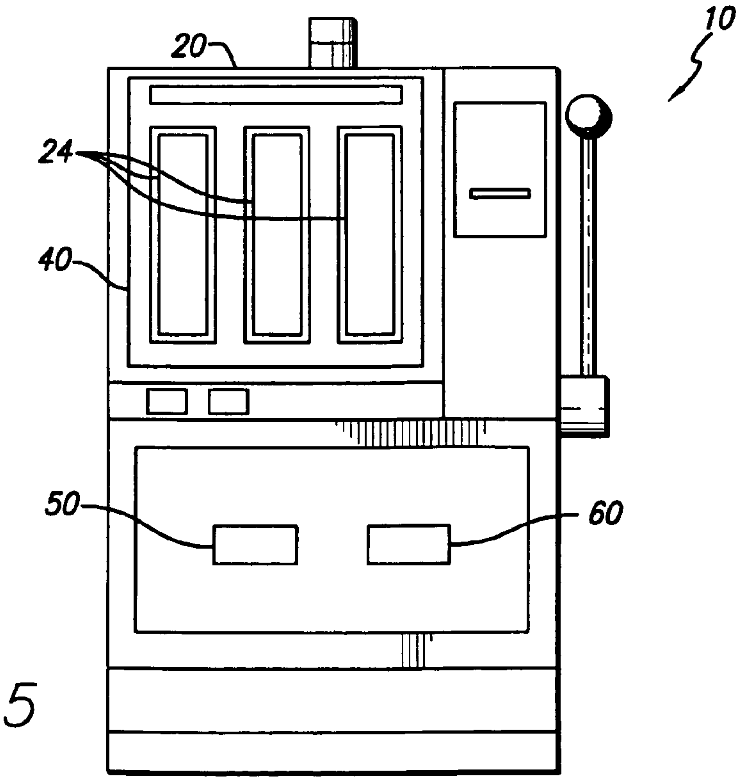
FIG. 5 illustrates a front view of the enhanced mechanical gaming system with a touch panel and touch sensor assembly incorporated into the gaming machine assembly of FIG. 4.

In this way, users are able to derive a unique and desirable feeling from the touch activation of a preferred embodiment enhanced mechanical gaming system 10 of the present invention. That is, users derive a feeling of greater control, flexibility, and interactivity. Referring again to FIGS. 1 and 2, a preferred embodiment enhanced mechanical gaming system 10 of the present invention provides many benefits through the incorporation of touch panel 40 into a mechanical system. These benefits include, by way of example only and not by way of limitation, enhanced game and system flexibility, enhanced game and system interactivity, positive psychological benefits, and resolution maintenance. The enhanced mechanical gaming system 10 of the present invention (as shown in FIGS. 4-5) easily lends itself to mechanical gaming applications such as second chance game embodiments, which allow a player to respin one or more reels 24 (as shown in FIGS. 3 and 6) by seemingly moving the reels up or down via the touch panel 40. The enhanced mechanical gaming system 10 of the present invention also lends itself to gaming applications like pseudo-skill game embodiments which allow a player to stop the reels 24 one by one and control the speed and direction of the reels, by touching the panel 40 in front of the reel.

Described now in greater detail, and referring to FIGS. 1-6, one preferred embodiment enhanced mechanical gaming system 10, constructed in accordance with the present invention, includes a standard reel-spinning slot machine, a piece of flat glass-like material having touch pad areas (not shown), touch panel transducers 34, wave reflectors (not shown), cabling (not shown), a bezel 44, a touch panel controller 50, touch panel driver software, and touch panel application software. As stated above, a standard gaming machine 20, such as a reel spinner machine, can be utilized with the present invention, preferably with minor modifications as further described below. The material for the touch pad areas (not shown), is either glass or other polymeric material suitable for propagating surface acoustic waves as specified by the particular touch panel producer. For applications where the touch panel 40 is being used in an existing frame, the size of the panel may need to be reduced in order to allow room for wiring that is preferably attached around the perimeter of the touch panel. Touch panel transducers 34, wave reflectors (not shown), and cabling (not shown), are utilized so as to conform with the parameters specified by the touch panel manufacturer. These components are preferably integrated into a touch panel 40. The Elo Touchsystems IntelliTouch panel is one manufacturer which produces a preferred touch panel 40 product, which may be used in accordance with the present invention.

In a preferred embodiment enhanced mechanical gaming system 10 of the present invention, the bezel 44 preferably covers the touch panel transducers 34, reflectors (not shown), and wiring (not shown), thereby providing protection from dirt, mechanical damage, and electrostatic discharge. The touch panel controller 50 is preferably capable of controlling and interpreting the touch panel 40, and communicating the corresponding touch data to associated game machine control circuitry or other host network. The Elo Touchsystems IntelliTouch serial controller is one preferred touch panel controller 50, which may be used in accordance with the present invention. The touch panel driver software is executed by the host machine, and is capable of controlling and interpreting data from the touch panel controller 50. Further, application software is configured to be capable of making calls to the touch panel driver software, initiating the controller, interpreting the touch data, and acting on this data according to the operational requirements of the application.

In a preferred embodiment enhanced mechanical gaming system 10 of the present invention, touching or otherwise activating the touch panel 40 in front of a mechanical reel 24 in a reel-spinning slot machine 20 activates the spinning of that reel. Further, in one preferred embodiment enhanced mechanical gaming system 10, a user can activate the touch panel 40 with a "slide-up" motion or a "slide-down" motion to initiate a reel spin or to control reel spin speed in the corresponding direction. In some embodiments, users can select a particular pay line by touching that pay line. Still further, users can select one of the plurality of reels as a "special" reel during game play, such as for example, selecting one reel as to be the reel to show a special symbol to obtain a bonus. Additionally, in some embodiments users can also select bet amounts per pay line or the demonstration to be used by touching particular points or locations on the touch panel 40.

In other preferred embodiment enhanced mechanical gaming systems 10 of the present invention, different types of glass-like materials are utilized for the touch panel 40, such as high frequency electricity specific materials. In a preferred embodiment, the transducers 34 are able to adhere to the skin of the glass-like materials of the touch panel 40 sufficiently to pass around curves. This allows a curved touch panel 40 to be utilized without detrimental effects. Also, one of ordinary skill in the art will appreciate that while the touch panel 40 is shown to be rectangular in shape with respect to FIGS. 1 and 2, the touch panel may be designed to accommodate the shape of any gaming machine configuration (e.g., circle, semi-circle, triangle, and the like).

As previously discussed, preferably modifications are made to a standard slot machine 20 when implementing a preferred embodiment enhanced mechanical gaming system 10. One such modification involves the mounting of the touch panel 40. In one embodiment of the present invention, the touch panel 40 uses prism-style transducers at three corners of the panel. The touch panel 40 is preferably positioned back and away from any framing by a small distance (e.g. approximately 3-5 millimeters in one embodiment) in order to prevent damage to the transducers 34. Likewise, as will be appreciated by those skilled in the art, any hardware that mounts onto the touch panel 40, such as displays, mounting brackets, lights, and the like, must be adjusted accordingly.

Another preferred modification to a standard gaming machine 20 in an enhanced mechanical gaming system 10 involves the bezel 44 frame. Once the panel 40 is positioned back and away from any framing, a bezel 44 frame is preferably utilized to seal around the touch panel 40 to protect the transducers 34 of the sensor assemblies 30. One component of the bezel 44 is a gasket (not shown) which protects the reflective surfaces around the perimeter of the panel. The gasket is preferably constructed of a foam rubber or other suitable material. When using the system, the gasket helps to ensure the reliable operation of the system, since dust and dirt can inhibit touch panel operation. Preferably, the gasket is positioned on the panel 40, just inside of the reflective pattern (not on top of the reflectors), so as not to dampen the reflective characteristics. In a preferred embodiment enhanced mechanical gaming system 10, the bezel 44 provides adequate clearance for the transducers 34, without impeding the acoustic properties of the sensor assemblies 30.

Still another modification to a standard gaming machine 20 in an enhanced mechanical gaming system 10 involves the application of graphic art work. Most applications require some form of graphic artwork on or behind the touch panel 40. Thus, preferably, a method of applying this art work is implemented that preserves the appearance of the panel 40, while maintaining a fluid manufacturing process. In this regard, there are three basic approaches. In the first approach, the artwork is applied directly to the touch panel 40, either before or after the process of applying the transducers 34 and wiring (not shown). However, this process subjects either the artwork and/or the transducers 34 to damage, as well as requiring two separate and sequential processes, resulting in a lengthy and more complicated manufacturing process.

In the second approach, the artwork is applied to a thin polymembrane such as lexan or other suitable material. The membrane in then attached to the transparent touch panel 40, preferably using an optically transparent adhesive. Lastly, in the third approach, the artwork is applied to a second sheet of glass. This glass is then mounted behind the transparent touch panel 40 using appropriate brackets. While this approach adds thickness to the overall glass assembly, the approach preserves the silk screening (or equivalent) process, without damaging the fragile touch sensor assemblies 30. This process also allows the use of existing art glass inventory. Further, the parallax effects from the added thickness are minimal, since the fraction coefficient of the two layers of glass causes light to bend inward, making the added depth undetectable to the user.

In addition to the provisions for mounting the touch panel 40, some modifications are also preferable for the mounting of the touch controller 50 in a preferred embodiment enhanced mechanical gaming system 10 of the present invention. The controller 50 typically includes a printed circuit board assembly, often encased inside a metal or plastic housing with mounting holes. In one embodiment, the controller 50 is mounted to the inside of the slot machine door or cabinet, and is preferably within reach of the touch panel wiring (not shown). The controller 50 is wired to the appropriate power and communication connections within the host machine, as specified by the touch panel manufacturer.

In order to make use of the touch panel 40 emanating from the touch controller 50, a slot machine 20 is operatively associated with the appropriate device driver software. Depending upon the host system's operating system and hardware configuration in the enhanced mechanical gaming system 10, driver software is usually available from the touch panel 40 manufacturer in a form that is easily loadable and executable. Other non-standard embedded control systems may require that custom driver software be written according to touch panel 40 interface specifications and in accordance with that specified by a touch panel manufacturer.

In one preferred embodiment enhanced mechanical gaming system 10, the application software takes data from the device driver and applies the touch data to the interactive application of the product. Sample applications include the spinning of reels, stopping of reels, lighting of lights, selection of game play elements, menu entries, wagering, service calls, payout activation, entry of player tracking data, or any other function in which a player or technician may interact with the machine. In another preferred embodiment enhanced mechanical gaming system 10, the touch panel 40 and sensor assemblies 30 are also utilized to activate game features and bonus games, such as additional buttons, bells, lights, whistles, top boxes, dice, genies, dancing chickens, and the like. In another preferred embodiment enhanced mechanical gaming system 10, the system allows players to spin reels backwards or forward, multi-denomination selection, and the activation of selected bonus sequences. In yet another preferred embodiment enhanced mechanical gaming system 10, the touch panel 40 and sensor assemblies 30 are utilized in other types of mechanical gaming systems 10 such as table top games, or in other non-gaming mechanical systems 10 such as in grocery stores or vending machines.

In one preferred embodiment enhanced mechanical gaming system 10 of the present invention which incorporates reel assemblies 24, these components are integrated into a unique spinning reel slot application. Preferably, a transparent touch panel 40 is laid over the reels 24, and receives user input (e.g., a "touch" on the touch panel 40) which activates a reel spin or a reel "nudge." Each reel 24 is individually controllable, which results in capabilities such as starting and stopping the reels in an arbitrary order, as well as nudging the reels in either forward or reverse directions. The hardware utilized in one preferred embodiment enhanced mechanical gaming system 10 of the present invention includes a touch panel 40 connected to a touch panel controller 50, a microprocessor 70 with associated support hardware, and a reel controller 80 (e.g., a generic device controller unit (GDCU)) running applications-specific reel controller firmware. As described in further detail below, in another preferred embodiment, a multi-tasking embedded controller circuit 100 (See FIG. 6) replaces the microprocessor 70 and GDCU reel controller 80. One preferred touch panel 40, used in accordance with the present invention, is the Elo Touchsystems "Orion" non-film touch panel 40. Additionally, one preferred touch panel controller 50 is an Elo Smart Set Controller (e.g., the IntelliTouch E281-2310 serial controller). Furthermore, one preferred microprocessor 70 is an Alliance Gaming Corp. microprocessor. Lastly, in one preferred embodiment, the GDCU reel controller 80 drives and controls a standard reel assembly 24 (e.g., an S6000 reel assembly).

In one preferred embodiment enhanced mechanical gaming system 10 of the present invention, the GDCU is the communications portion of the system 10 which "talks" to the different components of the gaming machine assembly 20. The GDCU allows a universal protocol and associated data to be used when interfacing with the physical devices (i.e., the components of the gaming machine assembly 20, such as the reels 24, stepper motors, lights, and the like). The GDCU allows multiple events having varying input signals to be interpreted by a single unit which is used to control the various devices.

Preferably, in one embodiment enhanced mechanical gaming system 10 of the present invention, the interface between the touch panel controller 50 and the microprocessor 70 is an RS-232 (serial connection to microprocessor serial one port). However, those of ordinary skill in the art will appreciate that any other suitable connection may be used. The microprocessor 70 is preferably connected to the GDCU via the microprocessor's USB port. The connections between the touch panel 40 and the touch panel controller 50 use custom wiring, such as harnesses in one preferred embodiment of the present invention, as do the connections between the GDCU reel controller 80 and the reel assembly 24.

In one preferred embodiment enhanced mechanical gaming system 10 of the present invention, the touch panel 40 interface with the touch panel controller 50 utilizes parameters specified by Elo Touchsystems. The controller outputs a serial data stream consisting of touch coordinate information. Preferably, the data stream format is defined in accordance with manufacturer specifications.

As previously mentioned, in one preferred embodiment of the present invention, the microprocessor 70 runs a Windows® application that translates the touch panel controller 50 serial touch information into reel control commands for the GDCU reel controller 80. However, any multi-tasking operating system such as VRTX, or any other embedded application may be utilized in the present invention. Preferably, the serial communications are handled by the microprocessor 70 using CommX (an ActiveX serial controller from GreenLeaf Software). Further, in one specific (non-limiting) embodiment enhanced mechanical gaming system 10, the touch panel 40 is divided into fourteen regions, which are analogous to "buttons." For each of the three reels 24 in this embodiment, there is a "nudge-up," "start reel," "stop reel," and "nudge down" button. Thus, there are a total of twelve reel control buttons in this embodiment. The other two buttons preferably are special purpose buttons, for functions such as "reel calibration" and "reel tilt." The touch panel 40 activations are translated in the same manner as the pressing of buttons. Each button press generates a single reel command that is sent to the GDCU reel controller 80 via the USB port. The application uses drivers to communicate with the GDCU reel controller 80 via the USB port.

In one embodiment enhanced mechanical gaming system 10 of the present invention, a communications protocol is implemented between an application and a reel group. In this regard, the windows controller (USB host) is referred to as the host, and the reel controller 80 running on the generic device controller unit (USB device) is referred to as the reel controller 80 (or simply, the controller). In one embodiment enhanced mechanical gaming system 10, the group control functions for a set of reels 24 are incorporated into the reel controller firmware. In this arrangement, the controller is responsible for assuring that a group of reels properly executes a spin function when the host makes a request. In one embodiment of the present invention, the reel controller firmware drives a set of three reels 24.

In one preferred embodiment enhanced mechanical gaming system 10, the USB host communicates with the controller. Further, the application can write to or read from the controller using the USB driver. The driver preferably takes care of USB details. The interface is analogous to a file interface. Writing to the open "GDCU handle" sends data to the controller and reading from the "GDCU handle" retrieves data from the controller. Thus, from the perspective of the host, a "command" message is interpreted as a write to the controller. An "interrupt" message is interpreted as a read from the controller. Lastly, a "query/response" is interpreted as a write followed by a read. In one embodiment of the enhanced mechanical gaming system 10 of the present invention, the USB "bulk" mode of transfer is utilized, in which the application must request any "interrupt" data by polling. However, in other embodiments of the present invention, the interrupt messages are eliminated and replaced with query/response type messages.

In one preferred embodiment enhanced mechanical gaming system 10 of the present invention, the reel spinning firmware is specifically designed and implemented for the generic device control unit (GDCU). The main task of the reel spinning firmware is to provide proper signals for driving the multiple stepper motors, which, in turn, spin the reels 24. Preferably, the motors are driven using a "full step" excitation sequence in which a single motor step is preformed by changing the excitation on one of the two-phase inputs in a specified sequence. The sequence determines whether the direction implemented is forward or reverse.

The reel drive pulse trains go through three distinct stages: acceleration, steady state, and deceleration. During acceleration, the reels 24 are driven with a pulse frequency that is less than the maximum "start/stop" frequency. Typically, if a motor is attempted to be started with a high frequency pulse, the motor loses synchronization and slips. Therefore, preferably the drive frequency is incrementally increased until the steady state drive frequency is reached. At steady state, the reels 24 are driven for a specified number of steps at the maximum drive frequency before going to the deceleration phase. During deceleration, the process is reversed and the drive frequency decreased until the stopping frequency is reached. Preferably, this procedure helps to prevent the reels 24 from slipping past the proper stop position on deceleration. Finally, at the stopping point, the motor excitation signals are held constant.

In one preferred embodiment enhanced mechanical gaming system 10 of the present invention, the functionality of existing spinning reel slot products are substantially duplicated. In this regard, portions of existing firmware (typically, but not essentially, written in C computer language) are directly ported, with few modifications, to the GDCU platform. However, the firmware code is also either more substantially modified or completely rewritten for the new platform in other preferred embodiment enhanced mechanical gaming systems 10 of the present invention (although the essence of the design may still be taken from well tested existing firmware code).

Another design implemented by a preferred embodiment enhanced mechanical gaming systems 10 of the present invention, is the minimization of microcontroller resources. In one embodiment, external timer units are used to generate motor drive signals. The GDCU firmware typically utilizes a single internal timer for reel signal timing. Another timer typically is utilized for USB communications timing. The accuracy of the pulse timing affects the ability of the reel spin to appear smooth. In this regard, the timer is used to generate an interrupt signal when pulse transitions are required.

In one preferred embodiment enhanced mechanical gaming systems 10 of the present invention, the structure of the firmware is divided into three parts: reel initialization, reel activation, and reel position sensing. The reel initialization portion of the firmware initializes the microcontroller resources used by reel spin. The firmware sets up a timer that generates an interrupt signal on rollover, configures an expansion port on the GDCU for output, and sets the reel driver phase outputs to known values. Preferably, the reels 24 are also calibrated, during which the reels 24 slow spin until the "home" reels stop position is detected for each reel 24.

The reel activation portion of the firmware of one embodiment includes an interrupter routine which accurately generates the motor drive pulse train and a start-up routine that initiates a game spin. Preferably, an interrupt service routine is invoked once for each stepper motor step. Further, a state machine is preferably implemented within the interrupt service routine which is responsible for generating acceleration, steady state, and deceleration pulse sequences for the reels 24. Additionally, in one preferred embodiment, a specific acceleration/deceleration pulse train is used to provide proper acceleration and deceleration without the motor losing synchronization and slipping.

The interrupt routine obtains the timer value required for the next reel control pulse. The interrupt routine uses this value to reload the timer. The actual phase control signals are generated and updated in a state machine case statement. In order to perform a motor step, the phase outputs for the reels 24 are updated. The pulse train for decelerating reels is also calculated. Finally, after getting through the state machine case statement, the last function performed by the interrupt routine is to sample the reel position input port and update the control outputs on the output port.

The reel position sensing portion of the firmware of one embodiment provides feedback to assure that the reels 24 are in the proper positions. In order to minimize the length of the timer interrupt service routine that is controlling the reels 24, the reel position input port is preferably sampled, and that sample put into a circular buffer. The buffer is read during the "main" loop and the position updated based upon that sample. Thus, preferably there is one sample every run, and since the timer runs once for each step of the motors, the reel positions are determined every time a reel step occurs. Thus, the firmware, in one preferred embodiment enhanced mechanical gaming system 10, tracks the current stop of each reel 24, the number of stops passed, and the stop count at which "home" is passed in order to allow calculation of the reels position.

Except for the motor control signal generation, which occurs in the timer interrupt service routine, all other functions occur in the context of the main loop processing in the firmware of one preferred embodiment enhanced mechanical gaming system 10 of the present invention. For example, each time through the loop, the firmware, in a preferred embodiment, checks to see if a new game spin has been initiated. If a spin has been initiated, the spin initialization routine is called. Further, each time through the loop, the firmware, in a preferred embodiment of the present invention, checks to see if a reel position sample is available in the sample buffer. Finally, if one of the reels 24 has stopped, the firmware in the present invention checks the reel final position. If a reel tilt is detected, remains in tilt mode ("slow spin") until the GDCU is reset, in one preferred embodiment of the present invention.

As shown in FIG. 6, in another preferred embodiment enhanced mechanical gaming system 10 of the present invention, the system 10 integrates the functional responsibilities of the GDCU and the microprocessor of the above described embodiments into a single embedded control system 100. The industry has various names for such a single embedded control system 100 of a gaming device. Such names, which include MPU (main or master processing unit), game board, and game controller, all relate to the single central embedded controller 100. The single central embedded controller 100 is capable of including both levels of functionality (GDCU and microprocessor) due to the nature of multiprocessing software architecture afforded by multitasking software operating systems. The single embedded control system 100 is capable of controlling both periphery devices (e.g., reel spinners) which are otherwise controlled by the GDCU, and controlling application software which is otherwise controlled by the microprocessor.

Touch panel devices have also been utilized in many different areas of technology for user input control, such as at automatic teller machines. However, standard touch panel devices have traditionally had a number of drawbacks that can limit their usefulness and their range as useful applications. For example, standard touch glass that is utilized in touch panel devices typically has a 23% reduction in light that passes through the touch glass. In a video gaming machine, this reduction in light can be resolved by increasing the brightness produced by the video monitor, and generally is less of an problem than in mechanical gaming devices.

In another preferred embodiment enhanced mechanical gaming system 10 of the present invention, the system utilizes multiple touch panels as a user control device for mechanical assemblies. In one preferred embodiment enhanced mechanical gaming system 10, the multiple touch panels (which contain touch glass or other suitable material, including composites, polymers, and the like) are used in gaming systems and allow for secondary interactive game features and system controls. For example, selecting one reel 24 for special game play, selecting denomination of game play, requesting service, requesting funds, and the like. In other preferred embodiment enhanced mechanical gaming systems 10, the multiple touch panels are utilized for other non-gaming applications, such as more generic control panels, in various other industries (e.g., grocery stores, department stores, vending machines, and the like).

Figure 7:
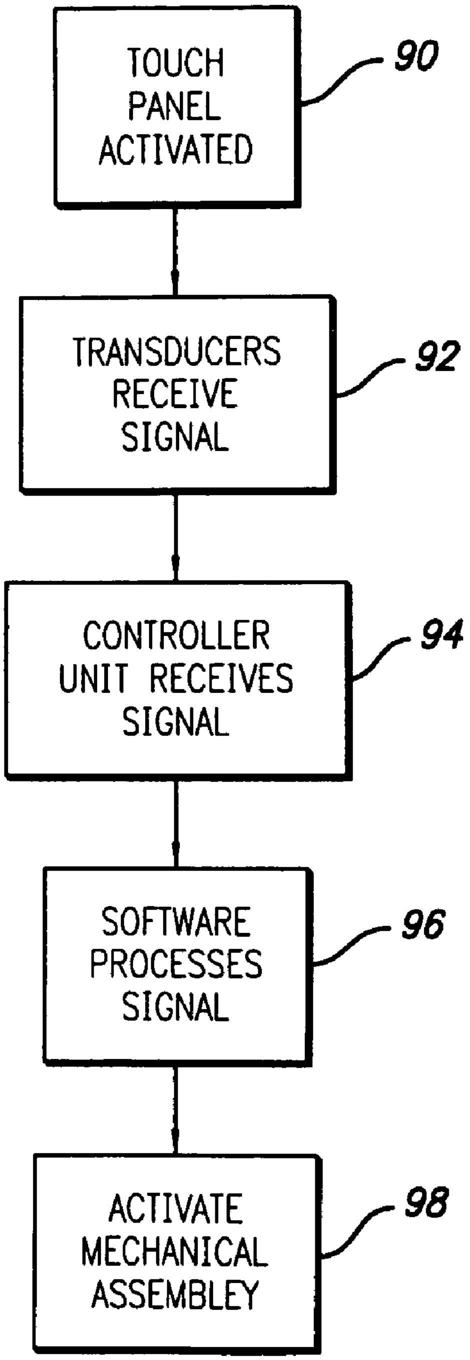
FIG. 7 illustrates an operational flow diagram of an enhanced mechanical gaming system, in accordance with the present invention.

As shown in FIG. 7, the logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in the system 10, in firmware, in special purpose logic, analog circuitry, or any combination thereof without deviating from the spirit and scope of the present invention as recited within the claims attached hereto.

As shown in FIG. 7, the logical operations of a preferred embodiment enhanced mechanical gaming system 10 of the present invention utilize the components of the system in a logical sequence. In the panel activation step 90, the touch panel 40 is activated. This occurrence produces a signal that is received by the transducers 34 associated with the touch panel 40 in the transducer signaling step 92. In the controller signaling step 94, a signal is sent to the touch panel controller 50 reporting the activation of the touch panel 40. From the touch panel controller 50, a signal is then sent to, and interpreted by, the touch panel software (which is in the microprocessor 70) in the signal processing step 96. Finally, the touch panel software sends a signal to the GDCU reel controller 80 to activate the mechanical assembly (e.g., the reels 24) in the mechanical activation step 98.

The following discussion is intended to provide a brief, general description of a suitable environment in which the invention may be implemented. While preferably the invention includes gaming machine assembly 20, a touch sensor assembly 30 incorporating a substantially transparent touch panel 40, a touch panel controller 50, and touch panel software 60, those skilled in the art will recognize that the invention may be implemented at least in part on an operating system in conjunction with one or more personal computers networked to one or more servers, and/or in combination with other program modules. Generally, program modules include routines, programs, components, data structures, and the like. The invention may also be practiced in distributed computing environments where tasks are performed by remote processing devices that are linked through a communications network. In a distributed computing environment, program modules may be located in both local and remote memory storage devices.

Although the invention has been described in language specific to computer structural features, methodological acts, and by computer readable media, it is to be understood that the invention defined in the appended claims is not necessarily limited to the specific structures, acts, or media described. Therefore, the specific structural features, acts and mediums are disclosed as exemplary embodiments implementing the claimed invention.

Furthermore, the various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. An enhanced, mechanical gaming system using touch panels as user control devices, the system comprising:

a primary display for displaying a game and for displaying a plurality of wager denominations; and a touch screen system associated with the primary display, the touch screen system comprising a touch sensor assembly having a substantially transparent touch panel that produces touch data when activated, a touch panel controller for controlling and interpreting the touch data, and touch panel software for controlling and interpreting touch data, wherein the touch screen system is configured at least for selecting the wager denomination for the game; and wherein different types of touch control are enabled in correspondence with the direction and speed in which the touch panel is touched by a user.

2. The gaming system of claim 1, further comprising one or more secondary displays, wherein each secondary display comprises a touch screen system.

3. The gaming system of claim 1, wherein the primary display presents one or more reels, wherein the primary display is selected from the group consisting of a video display, a plurality of concentric mechanical reels, and a combination of a video display and a plurality of mechanical reels.

4. The gaming system of claim 3, wherein the touch screen system is configured for selectively starting and stopping one or more reels by touching the touch panel at a particular point.

5. The gaming system of claim 1, wherein the touch screen system is configured for activating different game features by using distinct types of touch directions.

6. The gaming system of claim 1, wherein the touch screen system is configured for activating different game features by varying the speed of touches.

7. The gaming system of claim 1, wherein the touch screen system is configured for activating different game features by varying the duration or quantity of touches.

8. The gaming system of claim 1, wherein the touch screen system is configured for selecting one or more paylines, selecting a wager amount for one or more paylines, or a combination thereof.

9. The gaming system of claim 1, wherein the touch screen system is configured for activating special game play, activating bonus sequences, or a combination thereof.

10. The gaming system of claim 1, wherein the touch screen system further comprises one or more transducers integrated into the touch screen panel.

11. The gaming system of claim 10, wherein the touch screen system further comprises a bezel to protect the transducers.

12. The gaming system of claim 1, wherein the touch screen panel further comprises a composite membrane applied to the touch panel.

13. The gaming system of claim 12, wherein the composite membrane is mounted behind the touch screen panel.

14. The gaming system of claim 12, wherein the composite membrane is composed of glass.

15. The gaming system of claim 1, wherein the touch screen panel is curved.

16. The system of claim 1, wherein the system enables activation of a selected bonus sequence using a touch panel.

17. The system of claim 1, wherein the system enables selection of interactive game features using a touch panel.

18. The system of claim 1, wherein the system enables selection of game play elements using a touch panel.

19. The system of claim 18, wherein selection of game play elements using a touch panel comprises selection of a reel for special game play using a touch panel.

20. The system of claim 1, wherein the system enables selection of system controls using a touch panel.

21. The system of claim 20, wherein the system controls include player service requests.

22. The system of claim 20, wherein the system controls include player funds requests.

23. The system of claim 20, wherein the system controls include menu entries.

24. The system of claim 23, wherein the system enables technician interaction with the menu entries via the touch screen.

25. The system of claim 1, wherein the touch screen displays technician menus, and wherein the technician menus include reel calibration.

26. The system of claim 1, wherein the touch screen displays technician menus, and wherein the technician menus include special purpose functions.

27. An enhanced, mechanical gaming system using touch panels as user control devices, the system comprising:

a primary display for displaying a game;

a secondary display for displaying one or more game parameters, wherein the game parameters comprise one or more wager denominations; and a touch screen system associated with the secondary display, the touch screen system configured for selecting one or more game parameters, and the touch screen system comprising a touch sensor assembly having a substantially transparent touch panel that produces touch data when activated, a touch panel controller for controlling and interpreting the touch data, and touch panel software for controlling and interpreting touch data; and wherein different types of touch control are enabled in correspondence with the direction and speed in which the touch panel is touched by a user.

28. The gaming system of claim 27, wherein the primary display presents one or more reels, wherein the primary display is selected from the group consisting of a video display, a plurality of concentric mechanical reels, and a combination of a video display and a plurality of mechanical reels.

29. The gaming system of claim 27, wherein the touch screen system further comprises one or more transducers integrated into the touch screen panel.

30. The gaming system of claim 29, wherein the touch screen system further comprises a bezel to protect the transducers.

31. The gaming system of claim 27, wherein the touch screen panel further comprises a composite membrane applied to the touch screen panel.

32. The gaming system of claim 31, wherein the composite membrane is mounted behind the touch screen panel.

33. The gaming system of claim 31, wherein the composite membrane is composed of glass.

34. The gaming system of claim 27, wherein the touch screen panel is curved.

35. The gaming system of claim 27, wherein the game parameters further comprise one or more paylines, total wager for one or more paylines, or a combination thereof.

36. The gaming system of claim 27, wherein the game parameters further comprise special game play activation, bonus sequence activation, player tracking data interface, or a combination thereof.

37. The gaming system of claim 27, further comprising a second touch screen system associated with the primary display, wherein the second touch screen system comprises a second touch sensor assembly having a substantially transparent second touch screen panel that produces touch data when activated.

38. The gaming system of claim 37, wherein the second touch screen system further comprises one or more transducers integrated into the second touch screen panel.

39. The gaming system of claim 38, wherein the second touch screen system further comprises a bezel to protect the transducers.

40. The gaming system of claim 37, wherein the second touch screen system is configured for activating different game features by using distinct types of touch directions.

41. The gaming system of claim 37, wherein the second touch screen system is configured for activating different game features by varying the speed of touches.

42. The gaming system of claim 37, wherein the second touch screen system is configured for activating different game features by varying the duration of touches.

43. An enhanced, mechanical gaming system using touch panels as user control devices, the system comprising:

a primary game display;

a plurality of secondary displays, wherein each secondary display corresponds to a particular wager denomination value;

a plurality of touch screen systems, wherein each touch screen system is associated with one secondary display, each touch screen system comprising a touch assembly having a substantially transparent touch panel that produces touch data when activated;

a touch panel controller for controlling and interpreting touch data, wherein the touch panel controller is in communication with each of the touch screen systems; and touch panel software for controlling and interpreting touch data; and wherein different types of touch control are enabled in correspondence with the direction and speed in which the touch panel is touched by a user.

44. The gaming system of claim 43, wherein the primary game display presents one or more reels, wherein the primary game display is selected from the group consisting of a video display, a plurality of concentric mechanical reels, and a combination of a video display and a plurality of mechanical reels.

45. The gaming system of claim 43, further comprising a second touch screen system associated with the primary game display, wherein the second touch screen system is configured for selectively starting and stopping one or more reels, selecting one or more paylines for the game, activating a bonus game, activating a bonus feature, or a combination thereof.

46. The gaming system of claim 45, wherein the second touch screen system is configured for activating different game features by using distinct types of touch directions.

47. The gaming system of claim 45, wherein the second touch screen system is configured for activating different game features by varying the speed of touches.

48. The gaming system of claim 45, wherein the second touch screen system is configured for activating different game features by varying the duration of touches.

49. An enhanced, mechanical gaming system using touch panels as user control devices, the system comprising:

means for displaying a game and gaming related information, where the gaming information related information includes wager denominations; and means for sensing the displaying means being touched by a user, wherein the touch sensing means enable selecting a wager denomination by touching the displaying means, wherein the touch sensing means further comprises:

a touch sensor assembly having a substantially transparent touch panel that produces touch data when activated, touch panel software for examining and interpreting the touch data, and means for controlling gaming features from interpreted touch data, wherein the gaming features include at least selecting the wager denomination for the game; and wherein different types of touch control are enabled in correspondence with the direction and speed in which the touch panel is touched by a user.

50. The gaming system of claim 49, further comprising a means for controlling game play features.

51. The gaming system of claim 49, further comprising a means for controlling non-game play features.

52. An enhanced, mechanical gaming system using touch panels as user control devices, the system comprising:

a primary display for displaying a game; and a touch screen system associated with the primary display, the touch screen system comprising a touch sensor assembly having a substantially transparent touch panel that produces touch data when activated, a touch panel controller for controlling and interpreting the touch data, and touch panel software for controlling and interpreting touch data, wherein the touch screen system is configured at least for selecting the wager denomination for the game;

wherein the system enables activation of a selected bonus sequence using a touch panel; and wherein different types of touch control are enabled in correspondence with the direction and speed in which the touch panel is touched by a user.

53. An enhanced, mechanical gaming system using touch panels as user control devices, the system comprising:

a primary display for displaying a game; and a touch screen system associated with the primary display, the touch screen system comprising a touch sensor assembly having a substantially transparent touch panel that produces touch data when activated, a touch panel controller for controlling and interpreting the touch data, and touch panel software for controlling and interpreting touch data, wherein the touch screen system is configured at least for selecting the wager denomination for the game;

wherein the system enables selection of interactive game features using a touch panel; and wherein different types of touch control are enabled in correspondence with the direction and speed in which the touch panel is touched by a user.

54. An enhanced, mechanical gaming system using touch panels as user control devices, the system comprising:

a primary display for displaying a game; and a touch screen system associated with the primary display, the touch screen system comprising a touch sensor assembly having a substantially transparent touch panel that produces touch data when activated, a touch panel controller for controlling and interpreting the touch data, and touch panel software for controlling and interpreting touch data, wherein the touch screen system is configured at least for selecting the wager denomination for the game;

wherein the system enables selection of game play elements using a touch panel; and wherein different types of touch control are enabled in correspondence with the direction and speed in which the touch panel is touched by a user.

55. The system of claim 54, wherein selection of game play elements using a touch panel comprises selection of a reel for special game play using a touch panel.

56. An enhanced, mechanical gaming system using touch panels as user control devices, the system comprising:

a primary display for displaying a game; and a touch screen system associated with the primary display, the touch screen system comprising a touch sensor assembly having a substantially transparent touch panel that produces touch data when activated, a touch panel controller for controlling and interpreting the touch data, and touch panel software for controlling and interpreting touch data, wherein the touch screen system is configured at least for selecting the wager denomination for the game;

wherein the system enables selection of system controls using a touch panel; and wherein different types of touch control are enabled in correspondence with the direction and speed in which the touch panel is touched by a user.

57. The system of claim 56, wherein the system controls include player service requests.

58. The system of claim 56, wherein the system controls include player funds requests.

59. The system of claim 56, wherein the system controls include menu entries.

60. The system of claim 59, wherein the system enables technician interaction with the menu entries via the touch screen.

61. The system of claim 56, wherein the touch screen displays technician menus, and wherein the technician menus include reel calibration.

62. The system of claim 56, wherein the touch screen displays technician menus, and wherein the technician menus include special purpose functions.

63. An enhanced, mechanical gaming system using touch panels as user control devices, the system comprising:

a primary display for displaying a game;

a secondary display for displaying one or more game parameters; and a touch screen system associated with the secondary display, the touch screen system configured for selecting one or more game parameters, and the touch screen system comprising a touch sensor assembly having a substantially transparent touch panel that produces touch data when activated, a touch panel controller for controlling and interpreting the touch data, and touch panel software for controlling and interpreting touch data;

wherein the system enables activation of a selected bonus sequence using a touch panel; and wherein different types of touch control are enabled in correspondence with the direction and speed in which the touch panel is touched by a user.

64. An enhanced, mechanical gaming system using touch panels as user control devices, the system comprising:

a primary display for displaying a game;

a secondary display for displaying one or more game parameters; and a touch screen system associated with the secondary display, the touch screen system configured for selecting one or more game parameters, and the touch screen system comprising a touch sensor assembly having a substantially transparent touch panel that produces touch data when activated, a touch panel controller for controlling and interpreting the touch data, and touch panel software for controlling and interpreting touch data;

wherein the system enables selection of interactive game features using a touch panel; and wherein different types of touch control are enabled in correspondence with the direction and speed in which the touch panel is touched by a user.

65. An enhanced, mechanical gaming system using touch panels as user control devices, the system comprising:

a primary display for displaying a game;

a secondary display for displaying one or more game parameters; and a touch screen system associated with the secondary display, the touch screen system configured for selecting one or more game parameters, and the touch screen system comprising a touch sensor assembly having a substantially transparent touch panel that produces touch data when activated, a touch panel controller for controlling and interpreting the touch data, and touch panel software for controlling and interpreting touch data;

wherein the system enables selection of game play elements using a touch panel; and wherein different types of touch control are enabled in correspondence with the direction and speed in which the touch panel is touched by a user.

66. The system of claim 65, wherein selection of game play elements using a touch panel comprises selection of a reel for special game play using a touch panel.

67. An enhanced, mechanical gaming system using touch panels as user control devices, the system comprising:

a primary display for displaying a game;

a secondary display for displaying one or more game parameters; and a touch screen system associated with the secondary display, the touch screen system configured for selecting one or more game parameters, and the touch screen system comprising a touch sensor assembly having a substantially transparent touch panel that produces touch data when activated, a touch panel controller for controlling and interpreting the touch data, and touch panel software for controlling and interpreting touch data;

wherein the system enables selection of system controls using a touch panel; and wherein different types of touch control are enabled in correspondence with the direction and speed in which the touch panel is touched by a user.

68. The system of claim 67, wherein the system controls include player service requests.

69. The system of claim 67, wherein the system controls include player funds requests.

70. The system of claim 67, wherein the system controls include menu entries.

71. The system of claim 70, wherein the system enables technician interaction with the menu entries via the touch screen.

72. The system of claim 67, wherein the touch screen displays technician menus, and wherein the technician menus include reel calibration.

73. The system of claim 67, wherein the touch screen displays technician menus, and wherein the technician menus include special purpose functions.

* * * * *